United States Patent [19]
Fredrick, Jr.

[11] 3,993,402
[45] Nov. 23, 1976

[54] APPARATUS FOR DIRECTING A LASER BEAM

[75] Inventor: William G. Fredrick, Jr., Ann Arbor, Mich.

[73] Assignee: Photon Sources, Inc., Livonia, Mich.

[22] Filed: Oct. 29, 1974

[21] Appl. No.: 518,249

[52] U.S. Cl. ............................ 350/285; 350/6; 350/289; 350/299
[51] Int. Cl.² .......................................... G05D 25/00
[58] Field of Search .............. 219/121 L, 121 LM; 331/94.5, DIG. 1; 350/6, 7, 285, 288, 289, 299

[56] References Cited
UNITED STATES PATENTS

| | | | |
|---|---|---|---|
| 2,844,648 | 7/1958 | Rosenthal | 350/7 |
| 3,463,898 | 8/1969 | Takaoka et al. | 219/121 L |
| 3,534,462 | 10/1970 | Cruickshank et al. | 219/121 LM X |

FOREIGN PATENTS OR APPLICATIONS 2,014,448  10/1970  Germany .................. 219/121 L

OTHER PUBLICATIONS

Reed, *Bell Laboratories Record*, Oct. 1971, pp. 263–269.
Murray, *Western Electric Technical Digest*, No. 15, July 1969, pp. 33 and 34.
Arrabito, et al., *IBM Technical Disclosure Bulletin*, vol. 13, No. 10, Mar. 1971, p. 3098.

*Primary Examiner*—John K. Corbin
*Assistant Examiner*—F. L. Evans
*Attorney, Agent, or Firm*—Olsen and Stephenson

[57] ABSTRACT

Apparatus for directing a single laser beam to several predetermined positions on a workpiece. In a preferred embodiment of this invention, a laser beam is deflected from a plurality of rotating mirrors which sequentially intersect the laser beam thereby deflecting the beam through a lens to predetermined positions on the workpiece. By positioning each mirror so that at the point of intersection with the laser beam, its angular relation to the beam differs from the position of another mirror, the beam will be deflected to the plurality of predetermined positions. Thus, by providing apparatus in which rotating mirrors sequentially intersect a laser beam, a plurality of non-contact machining operations such as welding can be performed on the workpiece without indexing the workpiece or moving the laser equipment.

8 Claims, 4 Drawing Figures

APPARATUS FOR DIRECTING A LASER BEAM

BACKGROUND OF THE INVENTION

Laser beams have been utilized in the past for performing various non-contact machining operations such as welding and drilling. If more than one weld or drill hole were needed on a workpiece, the laser equipment would necessarily be deactivated or pulsed so that the workpiece could be indexed between pulses. Movement of the workpiece is a relatively slow and inefficient process and requires some degree of precision.

It is an object, therefore, of this invention to provide simple and economical apparatus for directing the full intensity of a single laser beam to a plurality of predetermined positions on a workpiece without moving the workpiece.

SUMMARY OF THE INVENTION

The present invention provides apparatus for directing the full intensity of a single laser beam to several predetermined spots on a workpiece. In a preferred embodiment of the present invention, an optical system is provided which includes a pair of mirrors mounted on rotatable shafts. Each shaft rotatably mounts within an adjustable carrier housing. This arrangement allows the axis of rotation of each mirror to be independently altered so that the angular relation of each mirror to the laser beam axis is different thereby directing the laser beam to the various predetermined positions on the workpiece. Universal joints connect each shaft with a drive unit to thereby provide for drive of the shaft in various positions. The mirrors are adjustable relative to each other so that the correct sequential intersection of the laser beam by the mirrors takes place as the apparatus is operating.

When each mirror rotates to the position where the laser beam is intersected, the beam deflects off the mirror through a focusing lens and onto the workpiece. The point on the workpiece that is hit by the deflected beam is determined by the angle of the beam to the optical axis of the lens. This angle is in turn determined by the relative position of the deflecting mirror to the axis of the laser beam. Since the relative position of each mirror differs, the resulting angle of reflection of the laser beam off of each mirror differs. Therefore, the incident angle of the beam upon the focusing lens will in like manner vary to insure that full beam intensity will be directed against different points on the workpiece.

In summary, the beam is always focused at a point in a focal plane determined by the angle of the beam to the optical axis of the lens and the focal length of the lens. Substantially any number of mirrors can be used in the present invention. By setting the mirrors at different angles and moving them so that they sequentially intercept the laser beam and direct it to the focusing lens, the full intensity of the beam can be focused at different spots on the work in rapid succession.

Further objects, features and advantages of this invention will become apparent from a consideration of the following description, the appended claims, and the accompanying drawing in which:

FIG. 4 is a view of the workpiece showing two weld spots formed thereon by the apparatus of this invention.

Figure 1:
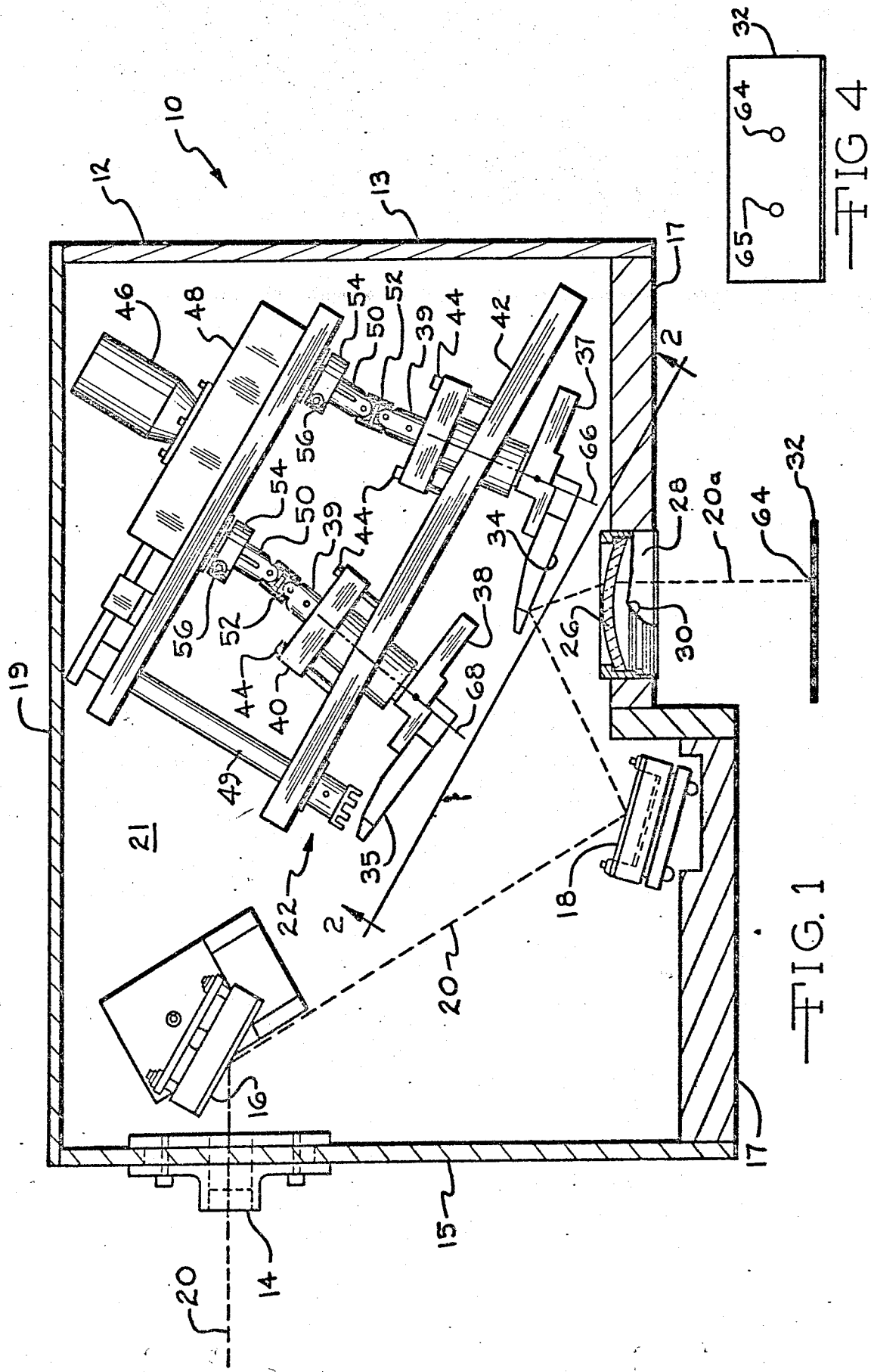
FIG. 1 is a top view of the laser beam deflecting apparatus of this invention with the front wall of the casing removed.

Referring to the drawing, the laser beam deflecting apparatus 10 shown in FIG. 1 consists of a casing 12 having walls 13, 15, 17 and 19 and a base 21. An entrance port 14, through which a laser beam is directed is formed in side wall 15. The path of the beam is indicated by the dotted line 20.

Angularly related mirrors 16 and 18 are adjustably attached to the base 21 and the front wall 17, respectively, so as to deflect the laser beam along the path 20 to an optical system 22. The mirrors 16 and 18 are adjustable so the path 20 of the laser beam can be changed without moving the laser.

A lens 26 removably mounted in lens holder 28 which is affixed to the wall 17 of casing 12, is situated so as the laser beam 20 passes through the lens 26 it is further directed and focused on a desired spot on workpiece 32. As more clearly seen in FIG. 3, the lens 26 is fixed in place by tightening set screw 30. Thus, the lens 26 can be focused by raising or lowering it relative to the workpiece 32.

The optical system 22 is mounted in casing 12 for directing the laser beam along the path 20 so that the full intensity of the beam will be directed at successively different angles through the lens 26. Mirrors 34 and 35, having flat surfaces, are removably attached respectively to mounting plates 37 and 38 thereby facilitating replacement of worn or scratched mirrors. The mounting plates 37 and 38 are removably secured to rotatable shafts 39 which rotate in carrier housings 40. The housings 40 are adjustably attached to a support frame 42 through means such as bolts 44. The frame 42 is in turn affixed to the casing 12. The axes of rotation 66 and 68, shown in FIG. 1, of the mirrors 34 and 35 can be altered by varying the relative position of the carrier housings 40 through adjustment of the bolts 44, thereby altering the angle of reflection of the laser beam from each mirror segment 34 and 35 to lens 26.

A motor 46 drives shafts 39 and the attached mirror segments 34 and 35. The motor 46 operates through a drive transmission unit 48 to rotate shafts 50. The drive transmission unit 48 can also be driven by a drive shaft 49 adapted to be connected to an external source of power. The shafts 50 are connected to the shafts 39 by universal joints 52. The universal joints 52 permit free rotation of the shafts 39 and the mirror segments 34 and 35 about varied axes.

A pair of collars 54, which connect the drive unit 48 to the shafts 50, enable mechanical adjustment to be made in the sequential timing of the mirrors 34 and 35. By loosening the collar screws 56, the shafts 39 along with the attached mirrors 34 and 35 may be individually rotated and repositioned relative to each other so that the laser beam is sequentially intersected in the correct manner during operation of the apparatus 10 and the mirrors mechanically clear each other during movement. Re-tightening of screw 56 maintains this adjustment.

The mirrors 34 and 35 are arranged so that as one mirror moves out of the path 20, the other mirror intersects the path 20 to deflect the beam so that it intersects lens 26 at a different angle. The arrangement of mirrors 34 and 35 is clearly shown in FIG. 2. The mirrors 34 and 35 are generally semi-circular in shape so that as mirror 34 moves away from point A, the mirror 35 immediately intersects the path 20 at point A. Mirror 34 is positioned to deflect the beam from path 20 to path 20a and mirror 35 is positioned to deflect the beam from path 20 to path 20b. Each mirror is perpendicular to the shaft on which it is supported.

Figure 2:
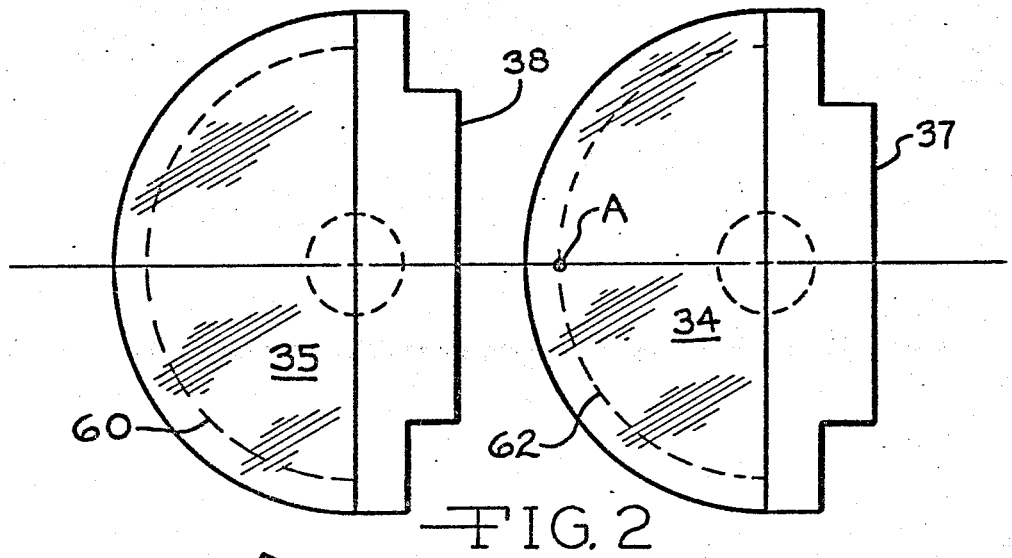
FIG. 2 is an enlarged diagrammatic view of some of the mirrors in the apparatus as seen from substantially the line 2—2 in FIG. 1.

Broken lines 60 and 62 in FIG. 2 indicate the paths where the beam intersects mirrors 34 and 35, respectively, as they are rotating. If more than two mirrors, such as four, are used in another embodiment of this invention, the optical system will accordingly be constructed so that each mirror will rotate independently of all other mirrors. Four independent shafts will thus be utilized. The mirrors will also be arranged so that each of the four mirrors will sequentially intersect the laser beam in the correct manner thus deflecting the beam through four different angles to lens 26. The mirrors would be constructed in suitable fashion, such as quadrants of a circular, so that maximum utilization of the beam is achieved.

Figure 3:
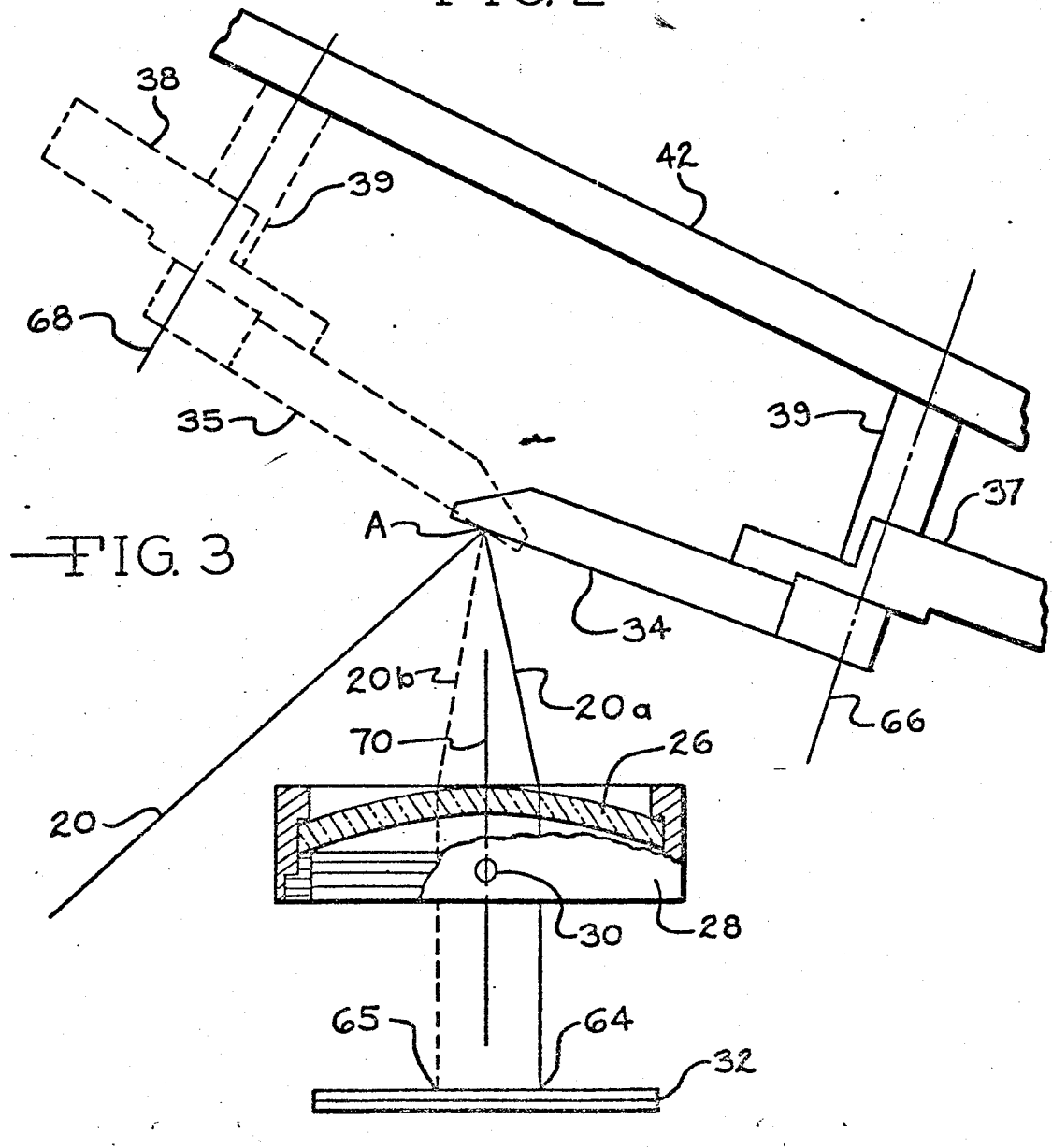
FIG. 3 is an enlarged fragmentary top view of the mirrors showing the path of deflection of a single laser beam when intersected by each mirror.

In the operation of the present invention, assume that weld spots 64 and 65 are to be formed on the workpiece 32. A laser beam is directed along path 20 through the entrance port 14 in the apparatus 10. The beam deflects off of mirrors 16 and 18 towards the general direction of the optical system 22 as shown in FIG. 1. Mirrors 16 and 18 are utilized to allow redirection of the path of the laser beam thereby eliminating any need to unnecessarily move laser equipment. The beam, after deflecting from mirror 18, intersects the continuously rotating mirrors 34 and 35 at point A as shown in FIG. 3. As rotating mirror 34 intersects the path 20, the beam is deflected along path 20a to lens 26 which focuses the beam at spot 64 on workpiece 32 to thereby form a weld. As mirror 34 rotates out of a position intersecting path 20, mirror 35, shouwn superimposed in broken lines (FIG. 3) intersects the path 20 and directs the beam along path 20b to lens 26 which focuses the beam on spot 65 on the workpiece 32 to thereby form a second weld.

As can be seen in FIG. 3, the mirrors 34 and 35, when they intersect the path 20, are at different angles relative to the path 20. This arrangement causes the beam on the path 20 to be deflected to lens 26 from different angles with respect to the optical axis 70 of lens 26. A laser beam directed through lens 26 at an angle to axis 70 is focused in a focal plane determined by the angle and the focal length of lens 26. In this case, the beam is focused at points on the workpiece forming the weld spots 64 and 65. By providing a plurality of mirrors 34 and 35 set at different angles and rotated to intercept the beam and direct it to lens 26, different focal spots can be obtained in rapid succession. In each case the full intensity of the beam is available.

It is not necessary that each mirror segment intersect the beam at the same point A as shown in FIGS. 3 and 4. The mirrors need only be arranged at varying angles relative to the path 20 of the beam after deflection off of mirror 18. Thus, a plurality of mirror segments may be located at any point along path 20 after deflection from mirror 18 to direct the laser beam through lens 26 to the predetermined spots on workpiece 32.

From the above description it is seen that this invention provides apparatus 10 for focusing a single laser beam at a plurality of spots on a workpiece 32. The apparatus 10 enables utilization of the full intensity of the laser beam at several predetermined spots with minimum to zero switching time required to deflect the beam from one spot to another. The apparatus 10 does not distort the beam and only the high efficiency flat mirrors illustrated at 34 and 35 are used. By virtue of the adjustability of the various elements in the apparatus 10, precise positioning of the focused laser beam is achievable. While only two mirrors, 34 and 35, are illustrated in the preferred embodiment of the invention, it is to be understood that higher numbers of mirrors can be used in the apparatus 10. The number of mirrors used in each instance will depend on the number of non-contact machining operations, such as welding, to be performed during each cycle of the apparatus 10. The utilization of only continuous rotary motion is advantageous in the apparatus 10 because it provides adherent balance and enables reliable operation of the apparatus 10 over a prolonged service life. No reciprocating or start-stop oscillating components are required.

What is claimed is:

1. Apparatus for directing a laser beam from a known path to a plurality of predetermined different paths extending in different directions, said apparatus comprising a plurality of mirrors, mounting means supporting said mirrors in positions in which each of said mirrors is movable into a position intersecting said known path, said mirrors being arranged relative to said known path such that each mirror is in a different angular relation with respect to said path than another one of said mirrors when each mirror is positioned to intersect said path, and means for moving said mounting means through a cycle in which said mirrors sequentially intersect said known beam path thereby directing said laser beam in predetermined different directions, said mounting means providing a substantially constant angular relation between each of said mirrors and said known path in positions of said mirrors intersecting said known path.

2. Apparatus according to claim 1 further including a focusing lens member, and lens holding means supporting said lens member in a position intersecting said predetermined paths and operable to focus said beam on predetermined spots.

3. Apparatus according to claim 2 in which said beam is directed through said lens at an angle to the optical axis thereof and focused at a point in a focal plane determined by said angle and the focal length of said lens.

4. Apparatus according to claim 1 wherein said mirrors are flat mirrors.

5. Apparatus according to claim 1 wherein said mirror mounting means is rotated so that said mirrors sequentially intersect said known beam path.

6. Apparatus according to claim 5 wherein said mounting means comprises a plurality of shafts, each of which eccentrically supports one of said mirrors, each of said mirrors being perpendicular to the shaft on which it is supported.

7. Apparatus for directing a single laser beam from a known path to a plurality of predetermined different paths extending in different directions comprising a plurality of mirrors, a plurality of rotatable shafts eccentrically supporting said mirrors in positions in which each of said mirrors is rotatable into a position intersecting said known beam path, said mirrors being arranged relative to said known beam path so that each mirror is in a different angular relation with respect to said path than another one of said mirrors when each mirror is positioned to intersect said path, and means for rotating said shafts through a cycle in which said mirrors sequentially intersect said laser beam path thereby directing said laser beam in predetermined different directions.

8. Apparatus according to claim 7 further including adjustable means operable to change the axis of rotation of each of said shafts.

* * * * *